Patented Oct. 31, 1939

2,178,270

UNITED STATES PATENT OFFICE 2,178,270

HORTICULTURAL GERMICIDE

Ned McLaughlin Sleeper, Upper Lake, Calif., assignor of one-third to Alfred Leroy Barber, one-sixth to Rex Lake, and one-sixth to William Thomas Gordon, Lake County, Calif.

No Drawing. Application June 6, 1938,
Serial No. 212,130

4 Claims. (Cl. 167—31)

This invention relates to improvements in horticultural germicides and, more particularly, to plant sprays for the treatment of "fire blight" and allied diseases in pear trees and related plants.

Fire blight is a bacterial infection, caused by a micro-organism known as Bacillus amylovorus. The disease affects all parts of the tree, both above and below ground. The organism usually enters the tree through the blossoms and, less frequently, through the actively growing shoots, both of which rapidly shrivel and darken in color as though scorched by fire. Cankers are formed in the bark which enlarge until eventually the blight kills the tree. A more complete description of this blight may be found in University of California Bulletin 586, (November 1934), entitled "Fire Blight of Pears and Related Plants" by H. Earl Thomas and P. A. Ark.

The principal object of the present invention is to provide a curative remedy for plants infected with fire blight.

Another object is to provide a remedy which will perform its germicidal function by being simply sprayed on the infected trees.

Other objects and advantages appear as this description progresses.

I have discovered that various metal complexes and other hydroxy aromatic derivatives of the tannins are highly destructive to the bacteria causing fire blight. Solutions of these complexes, when sprayed on the diseased trees, cause the infected cankerous portions to dry up and turn black. The inroads of the disease are arrested and the uninfected portions of the tree resume normal life. Tests show that, a few days after treatment of a blighted tree under the present invention, Bacilli amylovorus are completely exterminated. The cured tree will not act as a carrier of the blight.

Reference may be made, as to the sources, classification, and characteristic chemical reactions of the tannins, to the following works:

"The Natural Organic Tannins" by M. Nierenstein, published (1934) by Churchill Ltd., London.

"Chemie der gerbstoffe", article by M. Nierenstein in Vol. 15 of "Sammlung Chemischer Vortrage", edited by Ahrens and published (1910) by der Union Deutsche Verlagsgesellschaft, Stuttgart.

"The Tannins" by Trimble, published in two volumes, (1891–1894) by Lippincott Co., Philadelphia.

The distinguishing properties of a tannin are: (1) its phenolic reaction with ferric salts, (2) precipitation with gelatine, some alkaloids, and alkali metal bichromates, (3) fixation by animal fiber or tanning. Tannins give all of these tests. Various classifications of the tannins have been attempted, as, for example, by Freudenberg, Berichte 53 1416 (1920), into hydrolyzable tannins and condensed tannins which cannot be hydrolyzed.

The invention is, moreover, not limited to any particular class of tannins. The metal complexes of either hydrolyzable tannins or condensed tannins may be used. Nor is the invention limited to any particular metal complex of the tannins, for various common tannin salts or metal complexes may be used. The iron-tannin complexes are preferred because of cheapness and because iron is harmless to the foliage of the trees. However, other complexes or salts, such as those of copper, may be substituted.

In the practice of the present invention, the iron may be added in the form of a ferric salt solution of the tannin. However, it is preferred to simply place the tannin solution in contact with metallic iron, whereby the iron decomposes to yield the tannin complex directly. This latter procedure has the advantage of cheapness.

Commercial tannic acid is preferred in the practice of the present invention because of its relative inexpensiveness. A solution of the tannic acid of about .5 to 6 degrees Baumé density is made. Metallic iron, (a piece of cast iron will suffice), is placed in contact with the solution. After about twelve hours the decomposition of the iron and the formation of the soluble ferric tannic acid complex will raise the density of the solution to 1.8 or more degrees Baumé. The solution, after acquiring this density, is ready for use.

The solution is simply sprayed on the infected trees by the usual methods common in the horticultural art. If desired, it can be directly run into the sap of the trees by boring a hole in the trunks or branches of the trees, or it may be administered to the roots of the trees. One spray treatment is sufficient. The time at which the cure of the blight becomes evident depends upon weather conditions. In warm, sunny weather the blight cankers dry up within one or two days.

Having thus described the invention, what I claim and desire to secure by Letters Patent is:

1. The method of treating fire blight in pear trees and allied plants consisting in administering a solution of a metal complex of a tannin to the infected plant.

2. The method of treating fire blight in pear trees and allied plants consisting in spraying a solution of a ferric complex of a tannin on the infected plant.

3. The method of treating fire blight in pear trees and allied plants consisting in running a solution of a ferric complex of a tannin into the sap of the infected plant.

4. The method for controlling *Bacillus amylovorus* in pear trees and allied plants consisting in spraying a water solution of a ferric complex of tannic acid on the infected plant.

NED McLAUGHLIN S